(12) United States Patent
Uyehara

(10) Patent No.: US 8,777,092 B2
(45) Date of Patent: Jul. 15, 2014

(54) REUSABLE GIFT WRAP

(76) Inventor: Stacy Uyehara, Honolulu, HI (US)

( * ) Notice: Subject to any disclaimer, the term of this patent is extended or adjusted under 35 U.S.C. 154(b) by 268 days.

(21) Appl. No.: 12/856,539

(22) Filed: Aug. 13, 2010

(65) Prior Publication Data

US 2012/0037690 A1 Feb. 16, 2012

(51) Int. Cl.
*B65D 65/00* (2006.01)
(52) U.S. Cl.
USPC ........................................... 229/87.01
(58) Field of Classification Search
USPC ............ 229/87.18, 87.19, 89–91; 383/77, 75, 383/71, 72; 2/400, 49.1–49.5, 69.5; 220/903; 604/353, 377, 392, 385.01, 604/385.03, 385.04, 385.15, 385.21
See application file for complete search history.

(56) References Cited

U.S. PATENT DOCUMENTS

| | | | | |
|---|---|---|---|---|
| 1,429,545 A | * | 9/1922 | Stokes | 128/898 |
| 1,451,643 A | * | 4/1923 | Woody | 604/392 |
| D167,207 S | * | 7/1952 | Haars | D7/624.3 |
| 2,658,510 A | * | 11/1953 | Hilton | 602/58 |
| 2,734,543 A | * | 2/1956 | Hunter | 206/439 |
| 3,243,824 A | * | 4/1966 | Overholt | 2/238 |
| 3,968,799 A | * | 7/1976 | Schrading | 604/365 |
| 4,428,484 A | * | 1/1984 | Rattay et al. | 206/548 |
| 4,560,380 A | * | 12/1985 | Tharel | 604/385.19 |
| 5,188,877 A | * | 2/1993 | Magaro | 428/80 |
| 5,392,983 A | * | 2/1995 | Clarke-Bolling et al. | 229/87.19 |
| D366,396 S | * | 1/1996 | Chan | D7/624.3 |
| 5,529,395 A | * | 6/1996 | French | 383/75 |
| 5,743,458 A | * | 4/1998 | French | 229/87.03 |
| 6,228,459 B1 | * | 5/2001 | Bujalski | 428/80 |
| D542,150 S | * | 5/2007 | Bredbury | D9/705 |
| D613,564 S | * | 4/2010 | Goettler | D7/624.2 |
| 2006/0293639 A1 | * | 12/2006 | Van Gompel et al. | 604/391 |
| 2009/0097784 A1 | * | 4/2009 | Curren | 383/71 |
| 2010/0127052 A1 | * | 5/2010 | Uyehara | 229/87.19 |

* cited by examiner

*Primary Examiner* — Jes F Pascua
(74) *Attorney, Agent, or Firm* — Innovation Counsel LLP

(57) ABSTRACT

A flexible sheet that may be used and reused as a user-friendly and environmentally conscious wrapping material is presented. The sheet has a first corner, a second corner, a third corner, and a fourth corner, wherein the first corner and the second corner are connected by a first edge of the sheet and the third corner and the fourth corner are connected by a second edge of the sheet. The first corner and the second corner wrap around an object to enclose the object, and the third corner and the fourth corner wrap around the object, the first corner, and the second corner. A decorative bow is integrated with the sheet.

14 Claims, 5 Drawing Sheets

REUSABLE GIFT WRAP

FIELD OF THE INVENTION

The invention relates to a reusable article for wrapping an object.

BACKGROUND

The concept of gift exchange has been around for a long time in many different parts of the world. Often, a gift is covered in some form at the time of the exchange so that the object being gifted is concealed and/or decorated, and the covering usually makes the package appealing and attractive. The way gift wrapping has evolved today, it often involves a disposable paper product with a design that is attractive or indicative of the occasion, such as wrapping paper or a gift bag. Ribbons and bows are often used to further decorate the gift.

One of the problems with the modern-day gift wrapping practice is that it is inconvenient. First, one has to have all the right tools to even tackle gift wrapping: typically wrapping paper, bows and/or ribbons, tape, and scissors. One has to constantly replenish the wrapping material supply as it gets used, adding to the list of items one has to remember to buy. Second, purchasing the gift wrapping material is not as simple as purchasing milk or toilet paper. The decorative bows and ribbons have to complement the wrapping papers in terms of size, color, and occasion. Third, the wrapping and the decorating of the gift require a certain amount of skill and artistic talent to make the end product beautiful. Furthermore, depending on the shape of the object to be wrapped, creativity of varying degrees is required. If you do not have the time or the skill, gift wrapping can be a source of frustration. An alternative is to have the gift professionally wrapped, but that comes at an extra price.

Another problem with the modern-day gift wrapping practice is that it is wasteful. Wrapping papers, which often have beautiful and elaborate printed materials on them, are purchased with good money only to be ripped and thrown out by the gift recipient. Even if the wrapping paper were carefully opened without ripping, the fold lines and wrinkles would prevent the wrapping paper from being reused. The bows and ribbons may be reusable in theory, but they hardly ever get reused in practice because they have to be of the right length, thickness, and color to be used again.

Yet another problem with the modern-day gift wrapping is that it is not environmentally friendly. According to some studies, the current rate of paper consumption, especially during the holidays, is unsustainable. In addition to depleting the world's forests, the wrapping paper and decorative material all contribute to increased garbage production. After ending up in a garbage bin, the wrapping paper has to be processed (e.g., burned), contributing to environmental pollution. While people are becoming increasingly aware of the need to conserve natural resources such as trees and minimize pollution, there is no suitable alternative to the modern-day gift-wrapping practice.

Many publications today advocate reduction of paper usage, for example by skipping the use of wrapping paper altogether during holiday season. Given the above problems with modern-day gift wrapping practice, a way of wrapping gifts that requires less planning and skill, is less wasteful, and more environmentally conscious is desirable.

SUMMARY

In one aspect, the invention is a flexible sheet that has a first corner, a second corner, a third corner, and a fourth corner, wherein the first corner and the second corner are connected by a first edge of the sheet and the third corner and the fourth corner are connected by a second edge of the sheet, and wherein the first corner and the second corner are configured to wrap around an object to enclose the object, and the third corner and the fourth corner are configured to wrap around the object, the first corner, and the second corner.

In another aspect, the invention is a flexible sheet that has a first edge and a second edge that are fixed in folded positions to form a pocket, the first edge and the second edge extending between a first end and a second end of the flexible sheet, wherein the first end is designed to wrap around an object placed in the pocket and the second end is designed to wrap around the object and the first end.

In yet another aspect, the invention is a flexible sheet that has a plurality of corners, wherein pairs of adjacent corners are joined together to wrap an object.

DETAILED DESCRIPTION

The invention provides a user-friendly and environmentally friendly wrapping material. The distinct shape and design of the wrapping material allows an object to be wrapped with minimal effort while producing an attractive end product. The wrapping material, which may be made of fabric, is reusable and washable.

A "corner" of a sheet, as used herein, broadly refers to a section of a surface where two non-parallel edges meet. "Adjacent corners" are corners that are connected by no more than one edge. A "bow," as used herein, is not limited to a shape formed by tying two elongated portions together but may be any ornamental, attractive shape.

Figure 1:
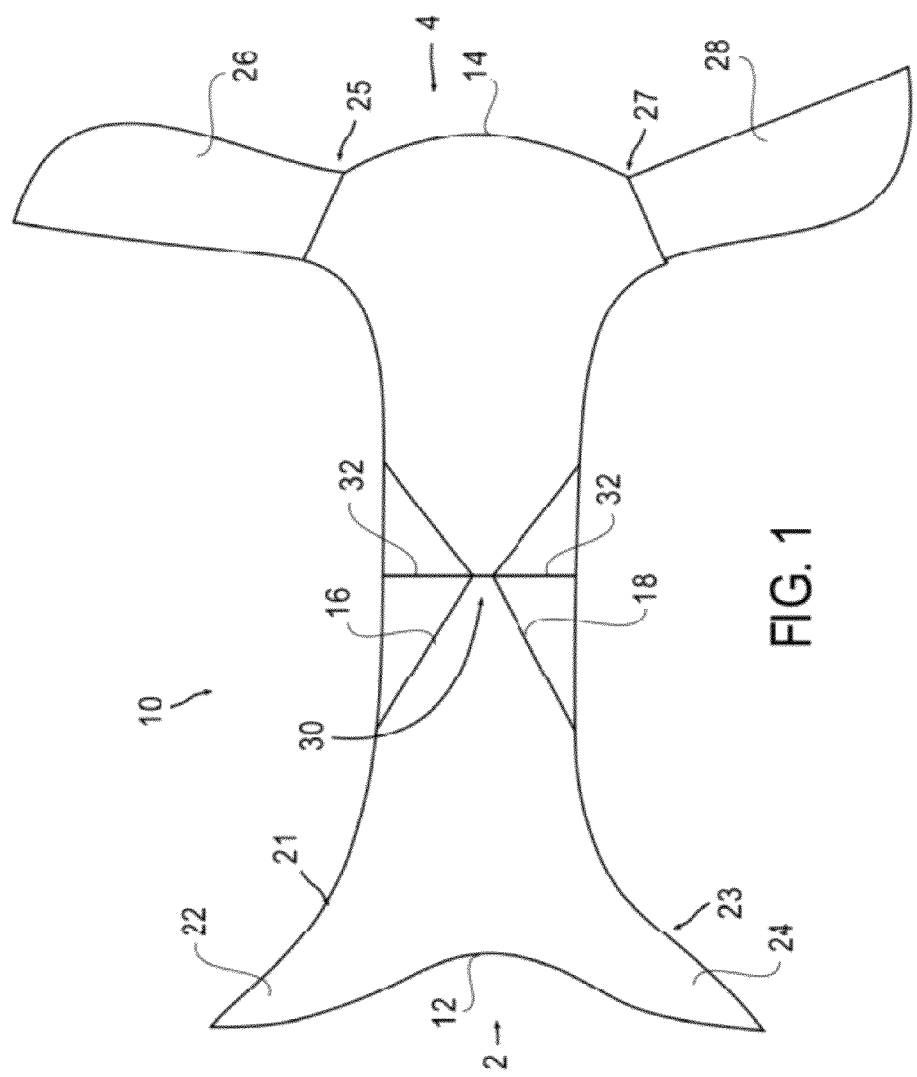
FIG. 1 depicts a flexible sheet in accordance with an embodiment of the invention.

FIG. 1 depicts a flexible sheet 10 in accordance with an embodiment of the invention. As shown, the flexible sheet 10 has a first end 2 that includes a first corner 21 and a second corner 23 and a second end 4 that includes a third corner 25 and a fourth corner 27. The flexible sheet 10 also has a first edge 12, a second edge 14, a third edge 16, and a fourth edge 18. The first edge 12 extends between the first corner 21 and the second corner 23 at the first end 2. The second edge 14 extends between the third corner 25 and the fourth corner 27 at the second end 4. The third edge 16 and the fourth edge 18 extend between the first and second ends 2, 4. More specifically, the third edge 16 connects the first corner 21 to the third corner 25, while the fourth edge 18 connects the second corner 23 to the fourth corner 27.

The first, second, third, and fourth corners 21, 23, 25, 27 each have a fastening mechanism. In the embodiment shown, the fastening mechanism includes flaps that are designed to be tied together. Specifically, the first, second, third, and fourth corners 21, 23, 25, 27 have a first flap 22, a second flap 24, a third flap 26, and a fourth flap 28 of the flexible sheet 10, respectively. In the particular embodiment, each of the corners of the flexible sheet 10 is elongated to form the respective flaps.

In the embodiment of FIG. 1, the first flap 22 and the second flap 24 have substantially the same shape (or are mirror images of each other), and the third flap 26 and the fourth flap 28 have substantially the same shape (oriented differently). The flexible sheet 10 may be a piece of fabric, so that the first flap 22 and the second flap 24 may get tied together around an object that is placed on the flexible sheet 10, for example near the middle portion. Similarly, the third flap 26 and the fourth flap 28 may get tied together around the object to complete the wrapping of the object.

The first flap 22 and the second flap 24 may be extensions of the flexible sheet 10 or separate pieces that are securely attached (e.g., stitched on) to the first and second corners 21, 23. Optionally, the third flap 26 and the fourth flap 28 may be made of a different material than the rest of the flexible sheet 10 so that when they are joined, the third flap 26 and the fourth flap 28 form a decorative bow. The third flap 26 and the fourth flap 28, for example, may be made of chiffon or organza, which would allow a bow to "plume" and enhance the aesthetic appeal of the end product.

Figure 2:
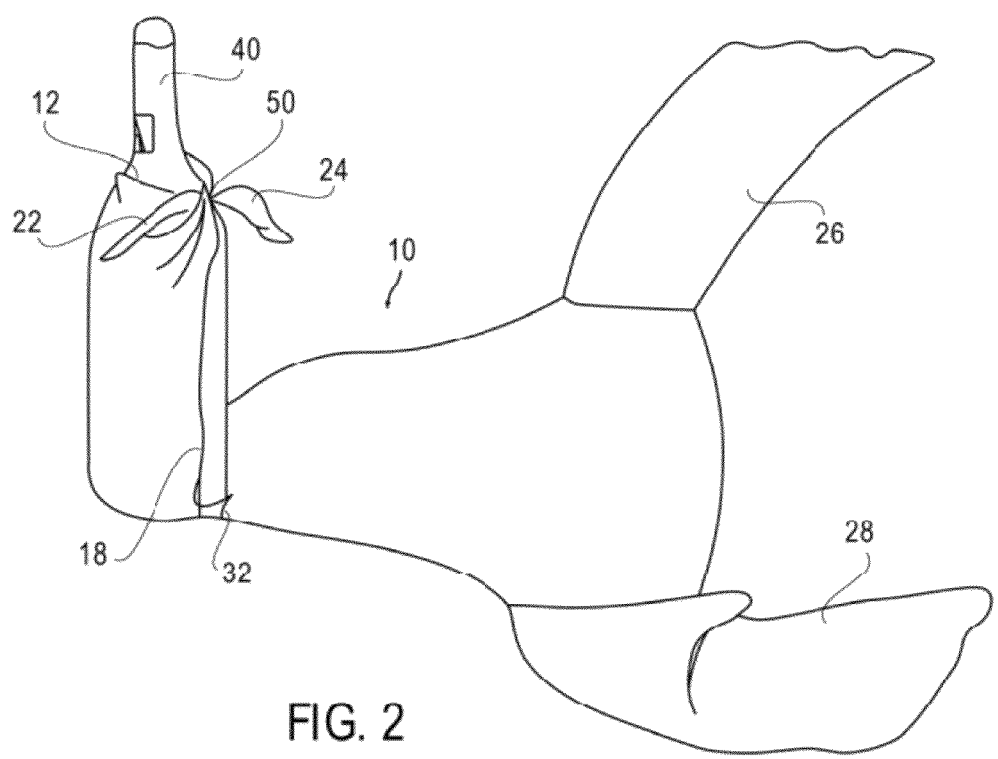
FIG. 2 depicts a bottle that is partially wrapped with the flexible sheet of FIG. 1.
Figure 3:
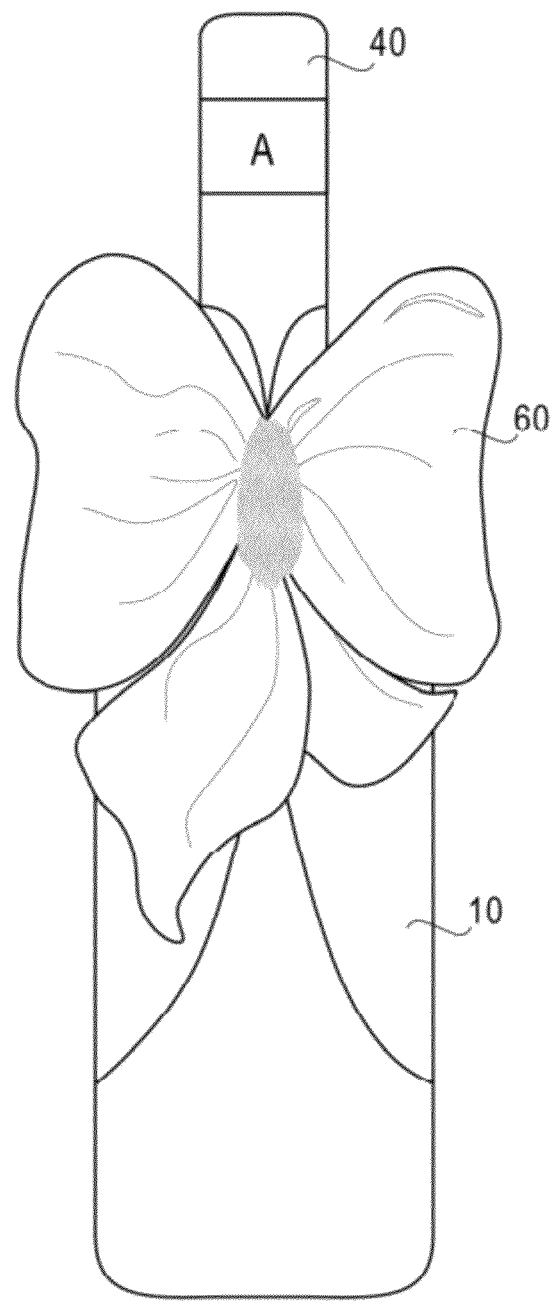
FIG. 3 depicts the bottle of FIG. 2 that is wrapped with the flexible sheet of FIG. 1.

As shown in FIG. 1, the third edge 16 and the fourth edge 18 are folded and fixed in the folded position, for example by stitches 32. These folded portions of the third and fourth edges 16, 18 form a pocket 30 into which an object can be placed. The folded portions of this embodiment have triangular shapes to enclose the base of the object being wrapped so that there is no exposed portion of the object near the base. The embodiment of the flexible sheet 10 shown in FIG. 1 is well-suited for wrapping objects that have tall, elongated shapes, such as a wine bottle. FIGS. 2 and 3 below describe how a wine bottle can be wrapped using the flexible sheet 10 of FIG. 1.

FIG. 2 depicts a bottle 40 that is partially wrapped with the flexible sheet 10 of FIG. 1. More specifically, the base of the bottle 40 is placed in the pocket 30 and the first and second corners 21, 23 are lifted up over the bottle 40 and joined. Where the first and second corners 21, 23 have flaps 22, 24, the flaps are tied together to form a knot 50. An area of the bottle 40 that is under the knot 50 may be exposed at this intermediate stage of wrapping.

FIG. 3 depicts the bottle 40 of FIG. 2 that is wrapped with the flexible sheet 10 of FIG. 1. In going from the intermediate wrapping stage depicted in FIG. 2 to the completely wrapped product depicted in FIG. 3, the third and fourth corners 25, 27 are pulled up over the bottle 40 to cover the first and second flaps 22, 24 (and the knot 50 if present). The third and fourth corners 25, 27 are joined on the opposite side of the bottle 40 from where the first and second corners 21, 23 are joined. Joining the third and fourth corners 25, 27 results in forming/placing a decorative bow 60 at a predetermined position on the object.

Figure 4:
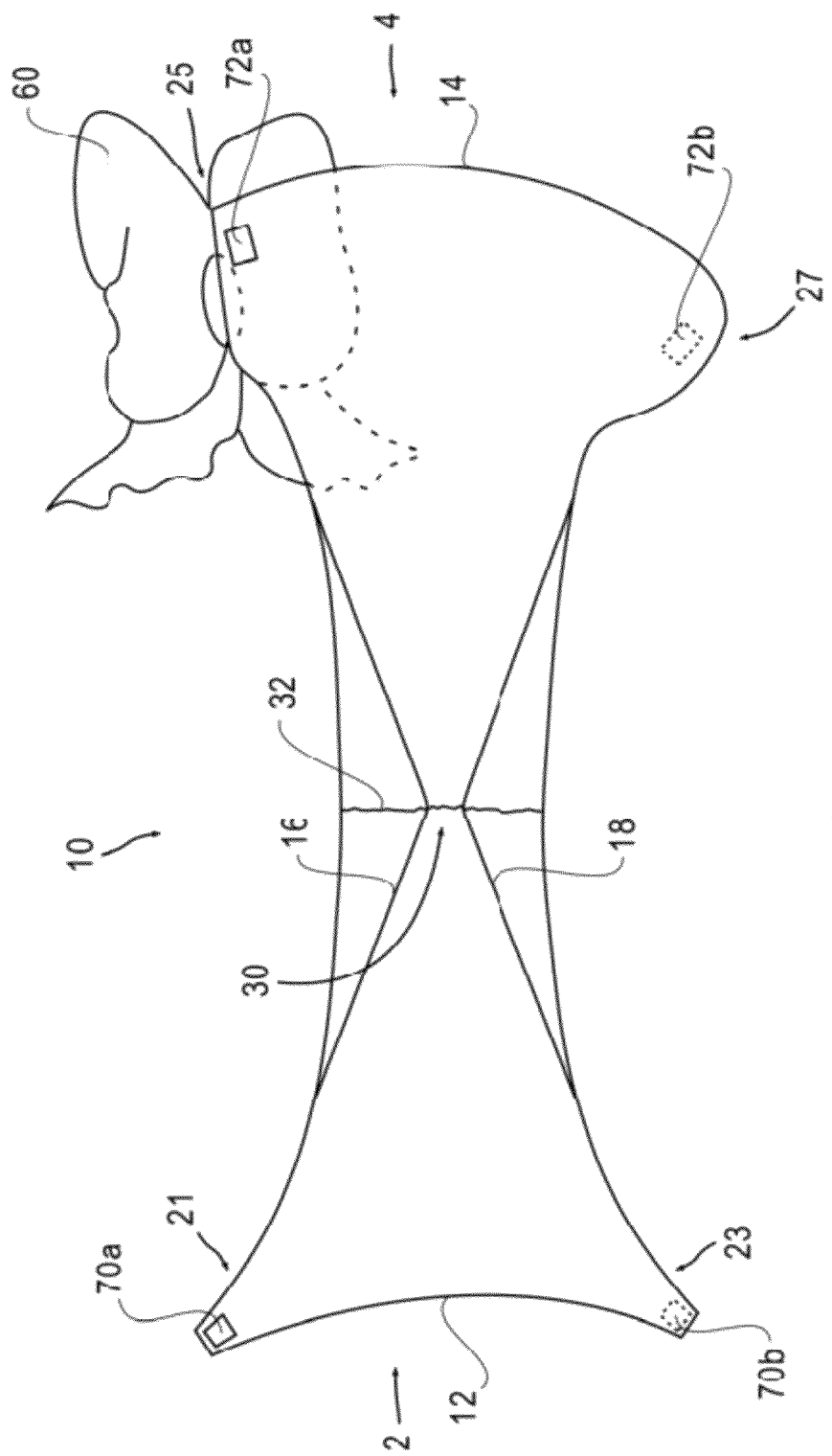
FIG. 4 depicts a flexible sheet in accordance with an alternative embodiment of the invention.

FIG. 4 depicts a flexible sheet 10 in accordance with an alternative embodiment of the invention. The flexible sheet 10 of FIG. 4 has substantially the same shape as the flexible sheet of FIG. 1, with the primary difference being the presence of fastening mechanism(s) other than flaps that tie together. The flexible sheet 10 of FIG. 4 would be used in a manner similar to the flexible sheet 10 of FIG. 1 in that the object to be wrapped would be placed in the pocket 30, the first and second corners 21, 23 would be pulled up and wrapped around the object, and then the third and fourth corners 25, 27 would be pulled up and wrapped around the object, the first corner 21, and the second corner 23.

The first corner 21 and the second corner 23 have a fastening mechanism 70a, 70b that keep the two corners coupled, such as a hook, Velcro, a snap, some type of adhesive surface, or any other suitable conventional mechanism. After the first corner 21 and the second corner 23 are joined, the third corner 25 and the fourth corner 27 are pulled up and wrapped around the object, and joined with the fastening mechanism 72a, 72b. The fastening mechanism 72a, 72b may be any suitable conventional fastening mechanism such as the ones mentioned above for the first and second corners 21, 23. In this embodiment, the bow 60 is preformed and attached to one of the third and fourth corners 25, 27 so that joining the third and fourth corners 25, 27 results in automatic positioning of the bow 60 on the bottle 40.

Other alternative embodiments may include a combination of select elements from the flexible sheet of FIG. 1 and select elements from the flexible sheet of FIG. 4. For example, the first and second corners 21, 23 may have fastening mechanisms 70a, 70b shown in FIG. 4 while the third and fourth corners 25, 27 may have flaps 26, 28.

Figure 5:
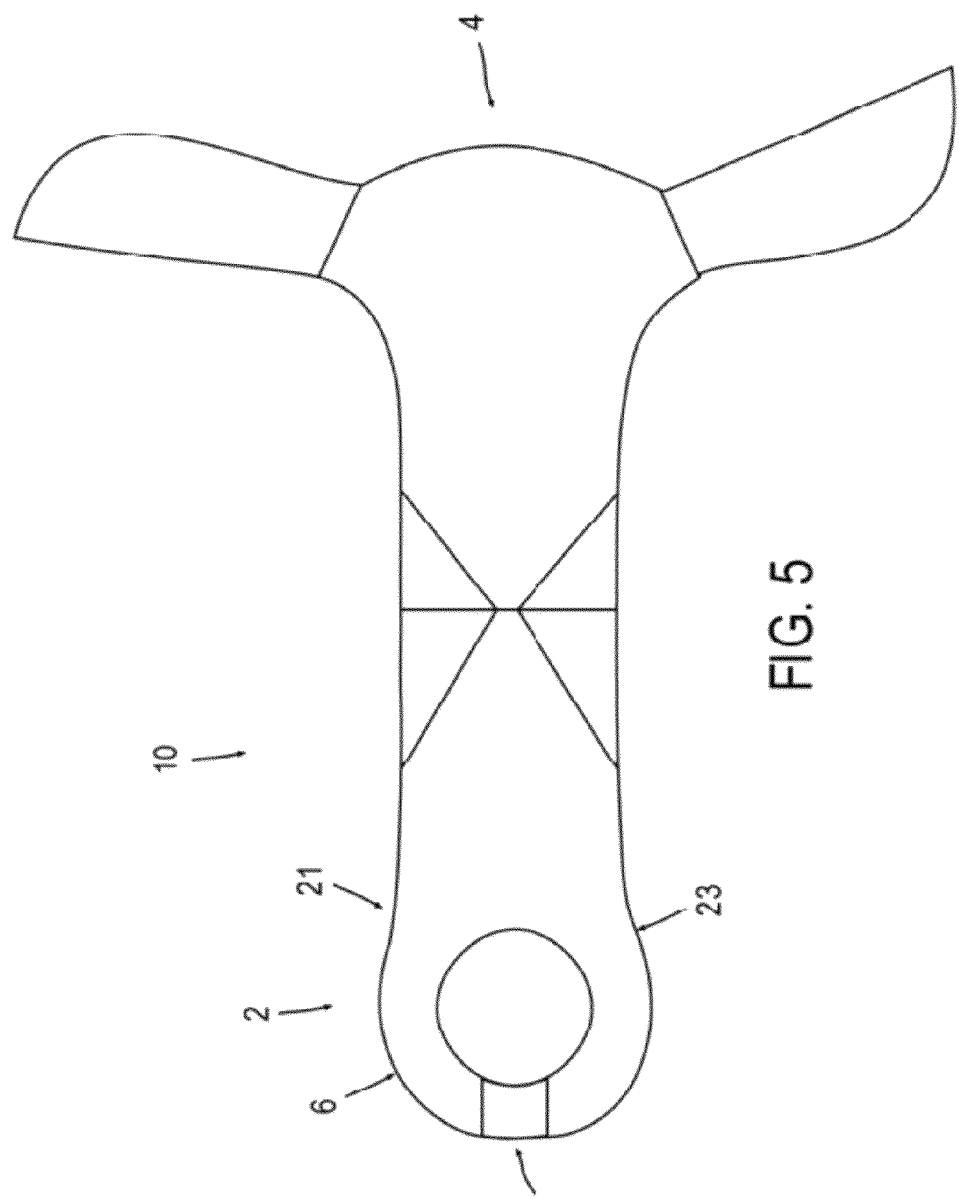
FIG. 5 depicts a flexible sheet in accordance with yet another alternative embodiment of the invention.

FIG. 5 depicts a flexible sheet 10 in accordance with yet another alternative embodiment of the invention. The flexible sheet 10 of this embodiment is similar to the embodiment of FIG. 1, with a primary difference being that the fastening mechanism 70a, 70b is a band 6. More specifically, the first corner 21 and the second corner 23 of the first end 2 are connected with the band 6, forming a loop at the first end 2. At least a portion of the band 6 is made of a stretchy or elastic material so that when the first end 2 is pulled up and wrapped around the object, the top end of the object can extend through the loop, holding the first end 2 in position. The second end 4 is then pulled up and wrapped around the object and the band 6 to complete the wrapping process. This embodiment of the flexible sheet 10 is especially suitable for wrapping an object like a wine bottle, which has a narrow bottleneck at the top. The band 6 can easily slide over the neck of the bottle and rest at the "shoulder" where the bottle widens. The elastic material in the band 6 allows the flexible sheet 10 to adapt to different-sized and differently-shaped bottles.

A distinctive characteristic of the flexible sheet 10 is that adjacent corners of the sheet are joined together to wrap an object. Typically, when a sheet is used to wrap an object, one would intuitively join two opposite sides or two corners that are positioned diagonally from each other. The flexible sheet 10 deviates from this typical method of wrapping.

It should be understood that the invention can be practiced with modification and alteration within the spirit and scope of the appended claims. The description is not intended to be exhaustive or limiting of the invention to the precise form disclosed. It should be understood that the invention can be practiced with modifications and alterations.

What is claimed is:

1. A flexible sheet for wrapping a bottle, comprising:
a first corner, a second corner, a third corner, and a fourth corner,
wherein the first corner and the second corner are connected by a first edge of the sheet, the third corner and the fourth corner are connected by a second edge of the sheet, the first corner and the third corner are connected by a third edge of the sheet, and the second corner and the fourth corner are connected by a fourth edge of the sheet,
wherein the third edge and the fourth edge are in folded positions to form a pocket along a length of the flexible sheet,
wherein each of the first corner and the second corner connects to a first flap and a second flap having a first shape, and each of the third corner and the fourth corner connects to a third flap and a fourth flap, the third flap and the fourth flap having a second shape that is different from the first shape and being made of a material different from the rest of the sheet, and wherein the sheet is symmetrically shaped with respect to an axis that extends through a length of the sheet; and wherein the first corner and the second corner are configured to wrap around to enclose the bottle, and the third corner and the fourth corner are configured to wrap around the bottle, the first corner, and the second corner and be tied together to form a decorative bow.

2. The sheet of claim 1, wherein the first flap and the second flap tie together around the bottle to form a knot.

3. The sheet of claim 1, wherein the first corner and the second corner are configured to wrap around the bottle and be joined with a fastening mechanism.

4. The sheet of claim 1 further comprising a preformed decorative bow attached to at least one of the third and the fourth corners.

5. The sheet of claim 1, wherein the pocket is configured to receive the bottle.

6. The sheet of claim 1, wherein the pocket comprises a folded portion of the third edge having a triangular shape.

7. The sheet of claim 1, wherein the sheet is a piece of fabric.

8. The sheet of claim 1, wherein the third edge and the fourth edge are folded toward each other to form angular shapes that point toward each other.

9. A flexible sheet comprising:

a first end having a first corner and a second corner;

a second end having a third corner and a fourth corner that are connected to a set of flaps that is made of a material different from the rest of the sheet such that the third corner and the fourth corner form a decorative bow when connected;

a first edge and a second edge that are fixed in folded positions to form a pocket, the first edge and the second edge extending between the first end and the second end of the flexible sheet, the first edge connecting the first corner to the third corner and the second edge connecting the second corner to the fourth corner of the flexible sheet, wherein the first end is configured to wrap around a bottle placed in the pocket and the set of flaps are configured to wrap around the bottle and the first end and be joined together, and wherein the first corner and the second corner are joined to keep the first end wrapped around the bottle and the third corner and the fourth corner are joined to keep the second end wrapped around the bottle;

a first flap connected to the first end and having a first shape; and a second flap connected to the second end and having a second shape that is different from the first shape, wherein the second flap is part of the set of flaps;

wherein the flexible sheet is symmetrically shaped with respect to an axis that extends from the first end to the second end.

10. The sheet of claim 9, wherein the first end and the second end comprise elongated flaps that are designed to be tied together.

11. The sheet of claim 10, wherein the flaps of the first end are configured to tie together into a knot and the flaps of the second end are configured to wrap around the knot and conceal the knot.

12. The sheet of claim 9 further comprising a fastening mechanism at the first end to keep the first end wrapped around the bottle.

13. The sheet of claim 9 further comprising a preformed decorative bow attached to the second end.

14. The sheet of claim 9, wherein a folded portion of the first edge has a triangular shape.

* * * * *